United States Patent [19]

Head

[11] Patent Number: 5,435,351
[45] Date of Patent: Jul. 25, 1995

[54] ANCHORED WAVEY CONDUIT IN COILED TUBING

[76] Inventor: Philip F. Head, 6 Leith Mansions, Grantully Road, London W9 1LQ, Great Britain

[21] Appl. No.: 40,186

[22] Filed: Mar. 29, 1993

[30] Foreign Application Priority Data

Mar. 31, 1992 [GB] United Kingdom ............ 9207070

[51] Int. Cl.⁶ ........................................ E21B 17/00
[52] U.S. Cl. ........................... 138/111; 138/113
[58] Field of Search ............... 138/111–115, 138/148, 175; 285/369; 166/241.1

[56] References Cited

U.S. PATENT DOCUMENTS

| | | | |
|---|---|---|---|
| 3,802,491 | 4/1974 | Plank, Jr. | 138/111 |
| 4,098,476 | 7/1978 | Jutte et al. | 138/108 X |
| 4,117,873 | 10/1978 | Crawford | 140/105 |
| 4,241,789 | 12/1980 | Grosch | 138/113 |
| 4,280,535 | 7/1981 | Willis | 138/113 |
| 4,325,438 | 4/1982 | Zuvela | 175/50 |
| 4,484,628 | 11/1984 | Schlumberger | 166/250 |
| 4,930,544 | 6/1990 | Ziu | 138/111 |
| 5,018,260 | 5/1991 | Ziu | 138/113 |
| 5,082,027 | 1/1992 | Stanley | 138/113 |

FOREIGN PATENT DOCUMENTS

| | | |
|---|---|---|
| 0264767 | 4/1988 | European Pat. Off. . |
| 2394909 | 6/1977 | France . |
| 120966 | 4/1900 | Germany . |
| 2311688 | 12/1974 | Germany . |
| 300307 | 11/1928 | United Kingdom . |
| 1455123 | 11/1974 | United Kingdom . |
| 2190457 | 11/1987 | United Kingdom . |

*Primary Examiner*—David A. Scherbel
*Assistant Examiner*—Patrick F. Brinson
*Attorney, Agent, or Firm*—Herbert Dubno

[57] ABSTRACT

A conduit lies on the inside wall of the tubing. A plurality of anchors are located along the length of the conduit, the anchors being activatable between an "active" state when the anchors engage the inside wall and a "neutral" state when the anchors are disengaged from the inside wall.

16 Claims, 9 Drawing Sheets

ANCHORED WAVEY CONDUIT IN COILED TUBING

FIELD OF THE INVENTION

This invention relates to a conduit which is installed internally of a tube and more particularly to an anchored wavey conduit in coiled tubing.

DESCRIPTION OF RELATED ART

Coiled or continuous reel tubing has been used in the oil industry for the last 20–30 years. The fact that it is a continuous single tube provides several advantages when entering a live oil or gas well which could have anything up to 7,000 psi well head pressure. This means the well does not have to be killed, (i.e. a heavy fluid does not have to be pumped down the production tubing to control the oil or gas producing zone by the effect of its greater hydrostatic pressure). Continuous tubing has the advantage of also being able to pass through the tubing through which the oil and/or gas is being produced, not disturbing the tubing in place.

Since its introduction, the uses and applications for coiled tubing have grown immensely, and now, rather than just being used to circulate various fluids in a well bore, it is not uncommon for coiled tubing to be used for conveying various hydraulically powered tools and more recently electrically powered tools on its end into the well. This has resulted in conventional electrical wireline logging cables or small hydraulic conduits being inserted into the inside of the reel of tubing so that these more sophisticated tools can be used and services can be performed.

A disadvantage which has resulted from this practice is the capstan effect of the smaller diameter wireline or hydraulic tube tending to be pulled very tightly to the inner surface of the continuous reel of tubing. When considering the effect this has on the geometry, it will be appreciated that the wireline or small hydraulic conductor will have a slightly smaller pitch circle diameter by comparison to that of the larger reeled tubing. The consequence of this is that for each complete 360 degrees the wireline or hydraulic tube will be slightly shorter in length than the larger reeled tubing, so that if this difference is added up over its total length of 12,000 ft (3657 m) or usually longer the difference in lengths could be as much as 200 ft (61 m).

This problem has been recognized due to the operational problems encountered. Either one end of the wireline or hydraulic tube can pull out of its connection, or else the reeled tubing itself can form a low frequency waveform caused by the tension in the conduit inside the reeled tubing, which prevents the reeled tubing being lowered any deeper into the well without the risk of damaging it.

Another disadvantage with using traditional wireline inside reeled tubing is that it is not compatible with many of the fluids pumped through the reeled tubing, the more common ones being corrosive stimulation fluids, and cement slurries used generally for zonal isolation. The reason for this, is that the wireline has two outer reinforcing layers of braided wire beneath which is an insulation layer protecting the conductors, which typically number up to eight. The normal insulation material is not compatible with the acid systems, although some expensive materials are available, but the total price becomes prohibitively expensive. Alternatively, when pumping cement slurries, the gaps between the braided wire of the cable form natural traps which collect some deposits of the cement slurry, which, when set, either make it difficult for the wireline to bend or, more commonly, the particles of set cement break off leaving residue inside the reel.

SUMMARY OF THE INVENTION

According to one aspect of the present invention there is provided a conduit which is to be installed internally of a tube comprising an internal bore.

The conduit comprises a plurality of anchors along its length, said anchors being activatable between an "active" state in which the anchors engage the internal bore of the tube and a "neutral" state in which the anchors are disengaged from the internal bore of the tube.

According to a second aspect the present invention there is provided an anchor for anchoring a conduit internally of a coiled tube comprising an internal bore, wherein the anchor is activatable between an "active" state in which the anchor engages the internal bore of the tube, thus preventing lateral movement between the conduit and the tube and a "neutral" state in which the conduit is able to be moved laterally relative to the tube.

According to a third aspect the present invention, there is provided a method of installing a conduit in a tube, said conduit and tube each comprising first and second ends, the method comprising the following steps:

(a) locating a first end of the conduit in the first end of the tube;

(b) enclosing the first end of the tube in a high pressure chamber;

(c) providing a seal between the conduit and the high pressure chamber;

(d) pressurizing the chamber by pumping in an appropriate fluid; and (e) pulling the conduit through the seal by means of pulling means within the high pressure chamber.

DESCRIPTION OF THE PREFERRED EMBODIMENTS

Figure 1:
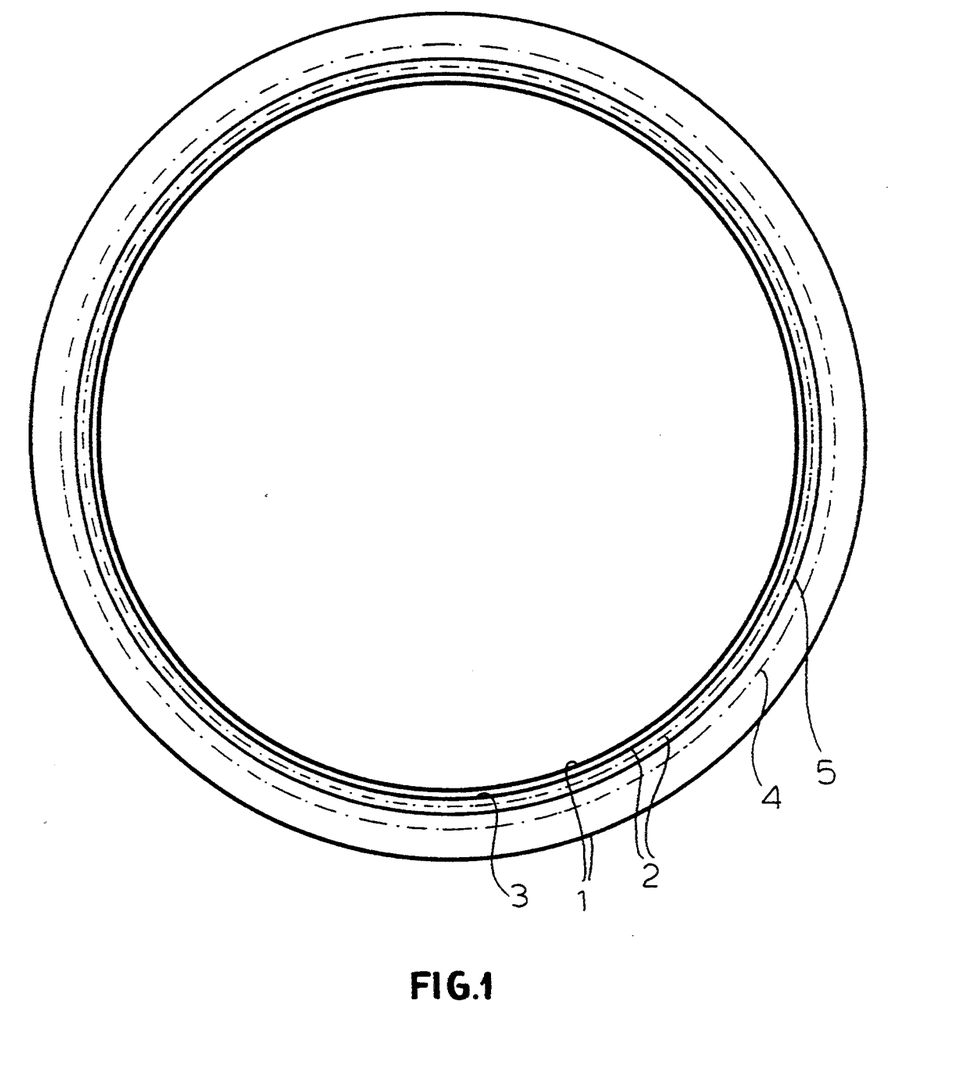
FIG. 1 is a side view of a coiled tubing reel showing a conduit lying inside it on its inner surface.

Referring first to FIG. 1, there is shown a side cross-sectional view of one wrap of coiled tubing 1, with a conduit 2, lying on the inside wall 3 of the coiled tubing. A dotted line 4 shows the diameter center line of the coiled tubing I while a second dotted line 5 shows the diameter center line of the conduit 2. It will be appreciated that because they have different center line diameters, their lengths per wrap will be slightly different with the coiled tubing being slightly longer. Multiplying this difference in length by the total number of wraps enables the difference in overall length to be determined, which can be in excess of 100 ft (30 m). It is this problem which this invention overcomes.

Figure 2:
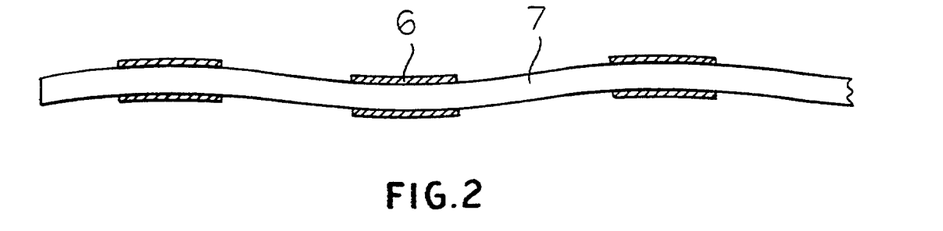
FIG. 2 is a side view of a section of braided wireline with formers making it into a wavey shape.
Figure 3:
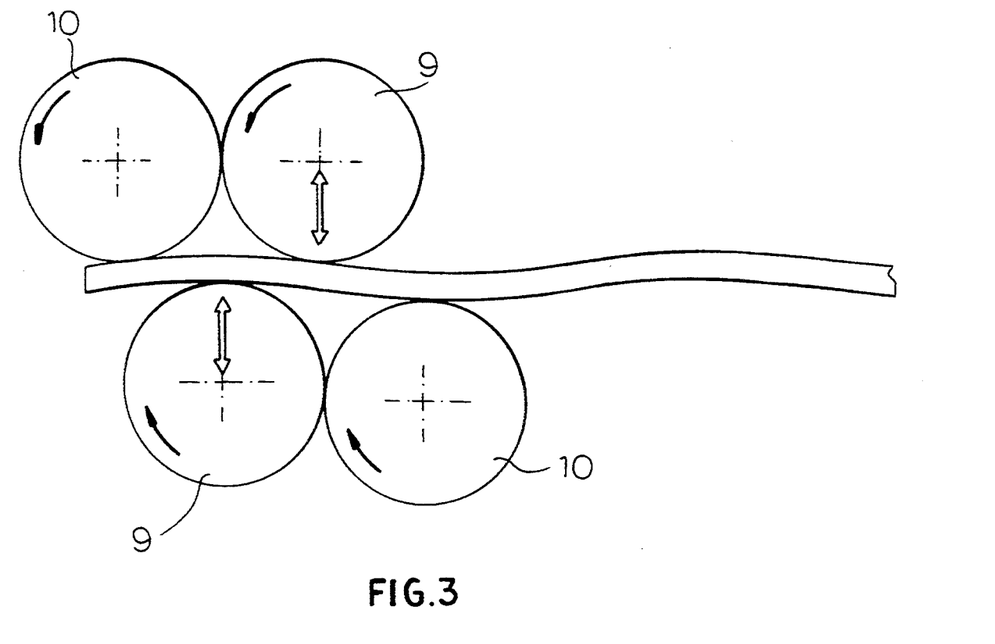
FIG. 3 is a side view of a tube being rolled into a wavey shape.
Figure 4:
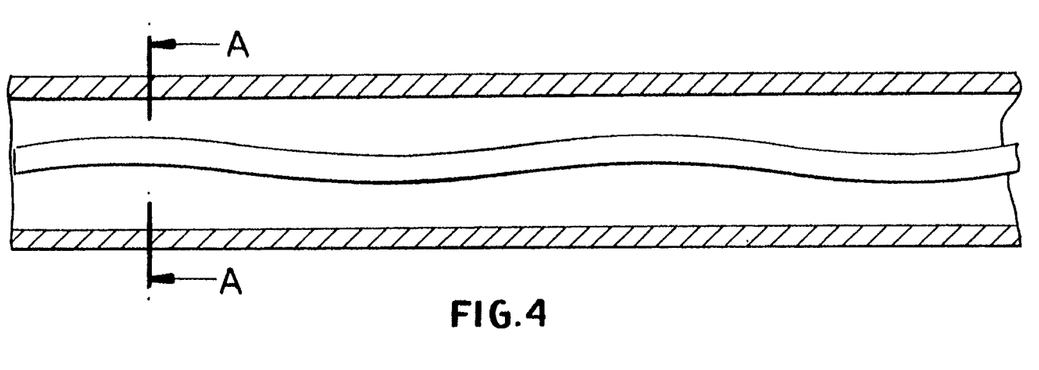
FIG. 4 is a side view of a wavey conductor inside a conduit for installation inside a coiled tubing reel.
Figure 5:
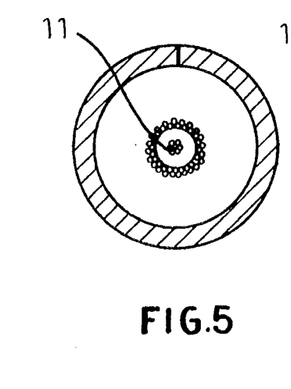
FIG. 5 is a cross-section taken along the line A—A of FIG. 4, through a conduit having a coaxial cable set in the middle of the conduit surrounded by high temperature potting compound.
Figure 6:
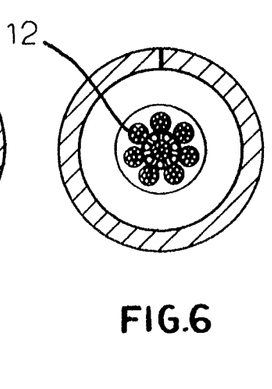
FIG. 6 is a cross-section taken along the line A—A of FIG. 4, through a conduit having a multi-conductor set in the middle of the conduit surrounded by high temperature potting compound.
Figure 7:
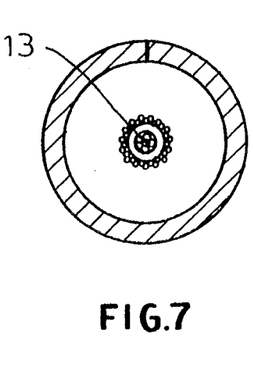
FIG. 7 is a view similar to FIG. 5, in which the conduit is a fiber optic cable.
Figure 8:
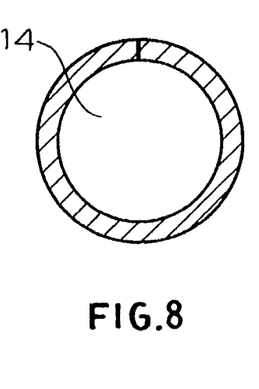
FIG. 8 is a view similar to FIG. 5, in which the conduit is a steel tube for transmitting hydraulic pressure, or for acoustic transmissions.
Figure 9A:
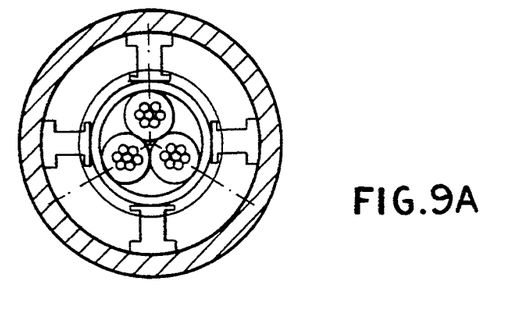
FIGS. 9A, 9B and 9C are views similar to FIG. 5, of a multi-conductor conduit installed inside a coiled tubing, for the combination of signal, power hydraulic and acoustic transmissions.
Figure 9B:
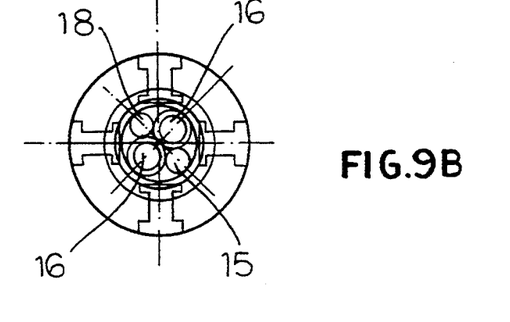
Figure 9C:
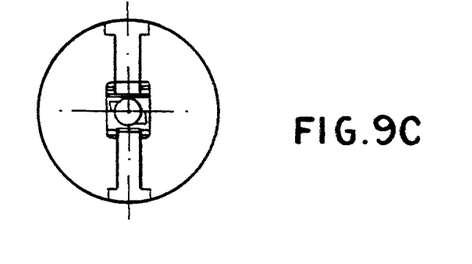

Referring now to FIGS. 2 and 3, there is shown a method and apparatus to make the conduit 2 wavey, for a straight line length, so that, when it is installed inside the coiled tubing 1, its length produces a longer length of conduit which will be equal to or of a greater length than the coiled tubing. Two methods of achieving this wavey profile are shown. The first is a curved sleeve 6 which fits over a conventional braided wireline 7 and forces the braided wireline to make the wavey shape shown. The distance these sleeves are positioned along the braided wireline determines whether a wavey or a not so wavey braided wireline is produced. In the case of FIG. 3, the conduit could be a hydraulic tube 8 which has been mechanically shaped into the wavey form by rollers 9 and 10. Again the severity of the wave can be chosen to assume any desired frequency.

Referring now to FIGS. 4 to 8, and FIGS. 9A, 9B and 9C several examples of the conduit function are shown; viz, an electrical signal via a coaxial cable 11, an electrical signal/electrical power via a multi-conductor cable 12, a fiber optics data transmission 13, a hydraulic conduit 14 or a combination of any of the above in a multi-conductor conduit 15. In this last example two multi-conductor conduit comprises two hydraulic lines 16, an electrical line 17 and a fiber optic line 18. The signal line inside the conduit could also follow a wavey profile, which could be important if the signal line is fiber optic.

Figure 10A:
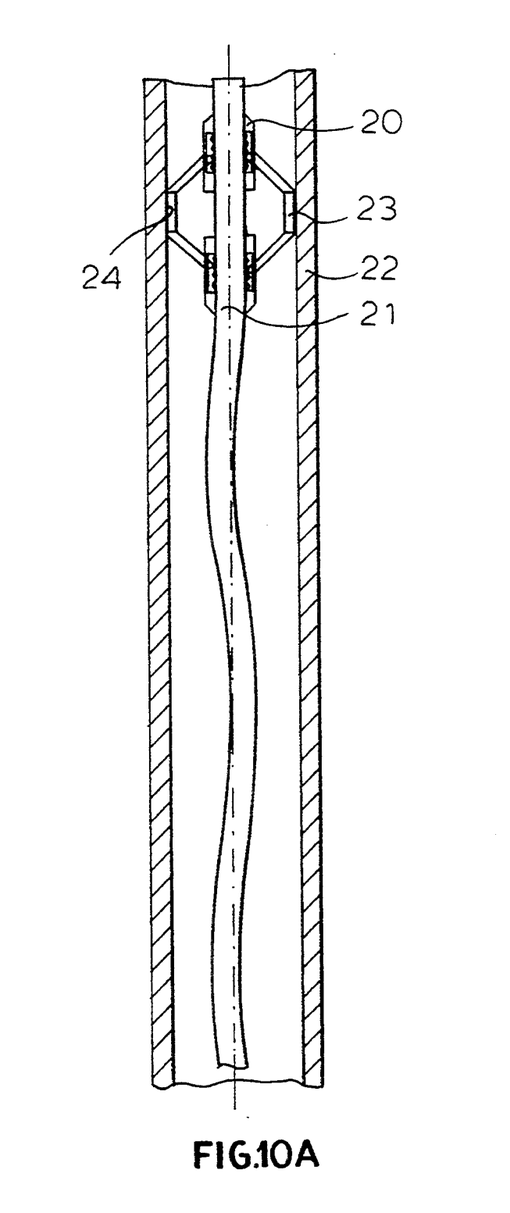
FIGS. 10A and 10B are side sectional views of a coiled tubing tube for hanging in an oil well with a wavey conduit inside being suspended by an apparatus anchoring it to the coiled tubing inner wall.
Figure 10B:
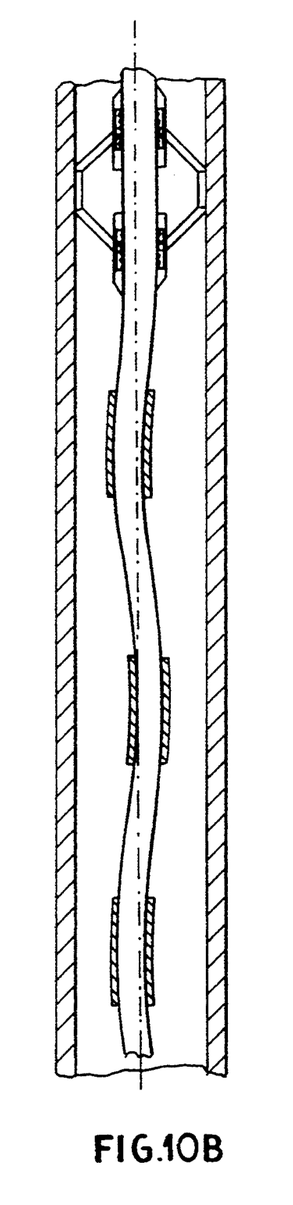
Figure 11:
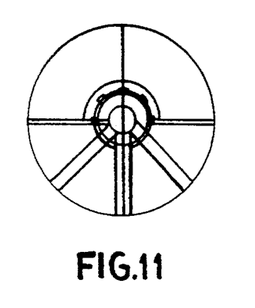
FIG. 11 is a cross-sectional view of one embodiment of an anchoring apparatus showing the upper half of the view in a collapsed position, and the lower half of the view in a deployed position.
Figure 12:
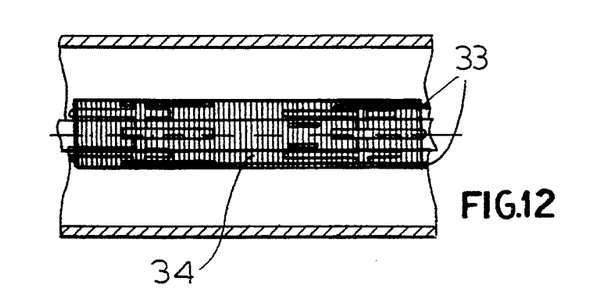
FIG. 12 is a side view of the apparatus shown in FIG. 11, with the sprung fingers of the apparatus retained in a collapsed position by magnesium wire.
Figure 13:
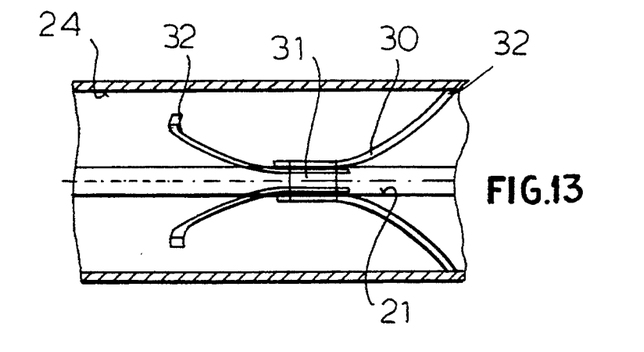
FIG. 13 is a similar view to FIG. 12, with the magnesium wire removed and the sprung fingers deployed, contacting and gripping the inner surface of the coiled tubing.
Figure 14:
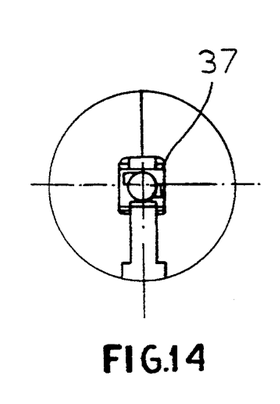
FIG. 14 is a cross-sectional view of a second embodiment of an anchoring apparatus showing the upper half of the view in a collapsed position, and the lower half in a deployed position.
Figure 15:
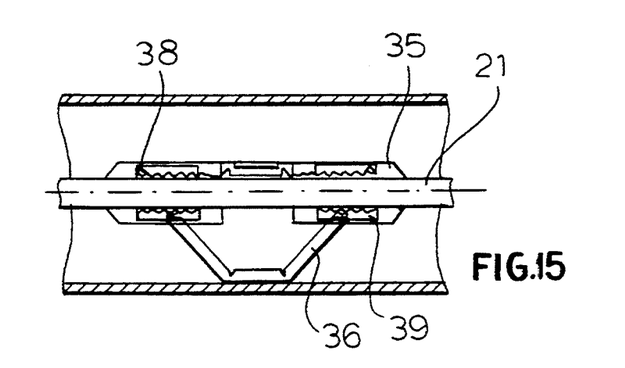
FIG. 15 is a side view of the apparatus shown in FIG. 14, the upper half of the view showing anchoring apparatus in a collapsed position and the lower half of the view in a deployed position.
Figure 16:
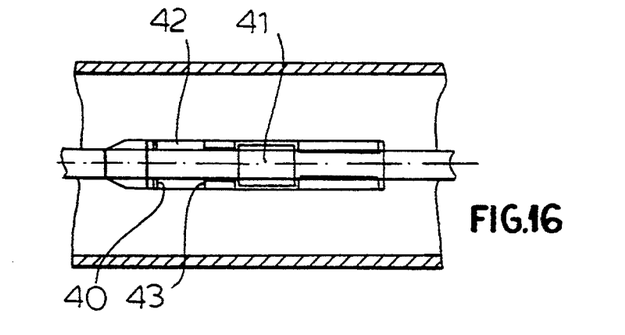
FIG. 16 is a plan view of anchoring apparatus shown in FIG. 14, in the retained position.

With reference to FIG. 10A and 10B, there is shown an anchoring apparatus 20 which is firmly attached to the conduit 21 inside the coiled tubing 22. The apparatus 20 has a plurality of arms 23 which are in an extended disposition and contact the inner surface 24 of the coiled tubing 22, anchoring the conduit 21 to the coiled tubing. This makes use of the coiled tubing 22 to carry the weight of the conduit 21 until the next anchoring apparatus 20, some distance further along the coiled tubing. It will be appreciated that because the conduit 21 does not have to support its entire length when hung vertically in an oil well, its dimensions and weight may be significantly reduced. It will also be appreciated that because the conduit 21 is anchored to the coiled tubing 22, no movement of the conduit is possible and the conduit remains in the same position regardless of pump rate and gravity effect. This prevents any "bird nesting" or bunching at the extreme end of the coiled tube string which is common with existing wireline installation and which causes cables to be pulled away from an electrical socket at the surface, which may cause the cable to crimp, resulting in a short circuit and disable the cable. In addition fiber optics may also be exploited, as the conduit is anchored to the coiled tubing, and it has a built-in slack due to its wavey form, both in the fiber optic cable inside its conduit, and in addition to the conduit itself having a wavey form, so that the fiber optic cable is not subjected to any stretching whatsoever.

FIGS. 11 to 16 show two embodiments of the anchoring apparatus 20, which will now be explained in more detail. In the first embodiment (FIG. 13), there is shown a plurality of sprung fingers 30, either attached to a central sleeve 31 or machined out of a single tube with the fingers formed to the necessary shape before heat treating them to impart a springy characteristic. The central sleeve 31 is attached to the conduit 21 by adhesive or by some mechanical means, e.g. a screw (not shown). On the ends of the sprung fingers 30, teeth 32 have been provided which anchor the apparatus to the internal surface 24 of the coiled tubing, and resist movement in both directions. So that the conduit 21 may be installed inside the coiled tubing 22 the fingers 30 must be retained close to the conduit surface 33, which is achieved by using a wrapping material 34. This may be made from any material which can be removed once the conduit 21 has been installed inside the coiled tubing 22. The conduit 21 might be installed at the time of manufacture, or installed some time after manufacture. It will be appreciated that if it is installed some time after manufacture it will have to withstand the effects of friction, because the conduit 21 might have to be installed by pumping it through the coiled tubing 22 which could be many thousands of feet long. The wrapping material 34 shown in this example is magnesium wire, which is strong and resists wear and tear as the conduit 21 is pushed into the coiled tubing 22. Once the conduit 21 is in position it is then necessary to remove the magnesium wire. This is achieved by pumping a volume of acetic acid into the coiled tubing 22 and displacing it throughout its entire length. As the acid passes the magnesium wire there is a very rapid chemical reaction which causes the magnesium wire to dissolve rapidly. Once it has dissolved the fingers 30 deploy under a spring bias force and move out to a point of equilibrium, where they contact and exert force against the inner surface of the coiled tubing 22, thereby providing the teeth 32 with some grip and resistance to be pulled along the inside of the coiled tubing 22 in either position.

In the second embodiment of an anchoring apparatus, illustrated in FIGS. 12 to 16, there is a tubular member 35 manufactured from titanium which is attached to the conduit 21 as in the embodiment above. Sprung members 36 again made from titanium are retained to the anchoring apparatus by a titanium plate 37 (see FIG. 14) which only covers the tip edges 40 of the sprung members 36. At the end of each sprung member is an edge 38 which when deployed locates in a ratchet groove 39 in the tubular member 35, so once deployed and subjected to tension again in either direction, the anchor pad 41 is forced harder and harder against the inside wall of the coiled tubing 22 and like all ratchet mechanisms it becomes tighter, locking itself against the coiled tubing wall, becoming a more effective anchor. To keep the sprung members 36 in the retained position, again magnesium is used in this embodiment as small blocks 42, which keep the sprung members 36 fully extended as the block is trapped between the ratchet surface 39 of the tubular member 35, the cover plate 37, the back part of the tip edge 40 and the pillar 43 of the tubular member 35. Titanium has been used in this embodiment for all the parts of the anchoring system, so that if it is required to remove the conduit from inside the coil tubing, it would be possible to destroy the anchoring system by pumping a volume of hydrofluoric acid through the coil tubing. As it is well known that titanium has no resistance to corrosion when exposed to hydrofluoric acid, it provides the possibility of salvaging expensive or special conduits from an old or damaged coil tubing reel.

Figure 17:
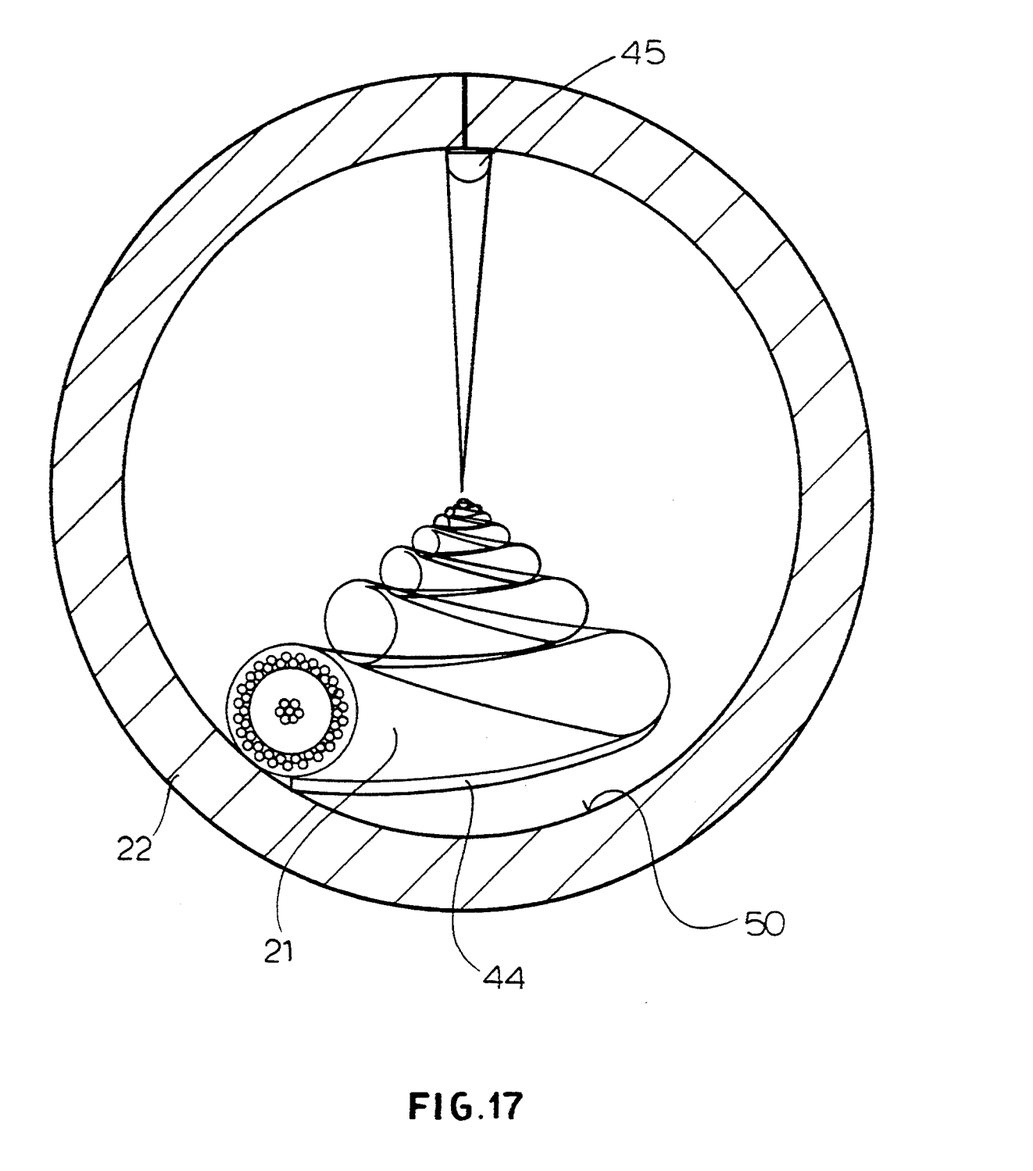
FIG. 17 is a cross-sectional view of coiled tubing with a wavey conduit bonded to the lower inner surface of the coiled tubing tube.

With reference to FIG. 17, FIG. 17 shows a wavey conduit 21 lying on the lower inner surface 50 of the coiled tubing 22 and bonded at 44 to the coiled tubing along virtually its entire length. This is achieved either at the time of manufacture of the coiled tubing 22, exploiting the heating treating process necessary to stress relief the coil tubing weld line 45 to also cure the bonding agent 44 or alternatively, the bonding agent 44 could be a layer on the outer surface of the conduit and once all the conduit has been inserted into the coiled tubing can be either exposing the adhesive layer to either a ketone solvent or by exposing the coiled tubing to a controlled heat source in excess of 120° C. An industrial adhesive available which could perform this function is a 3M product called Scotchgrip 847, which in addition retains some elastomeric properties while never being reactive again.

Figure 18:
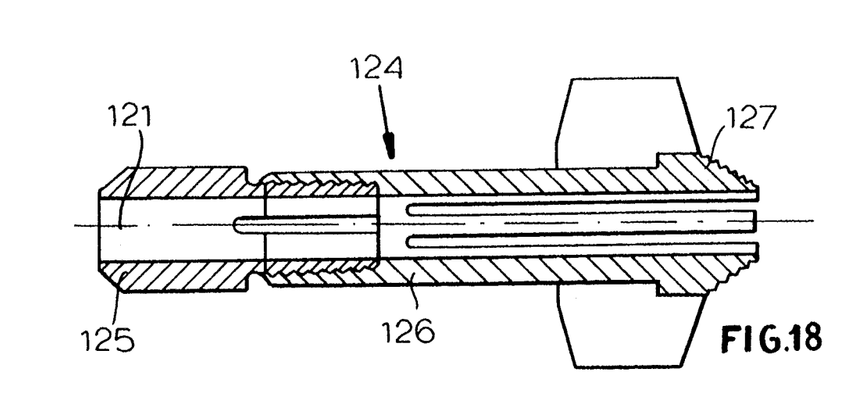
FIG. 18 is a longitudinal cross-section of an anchor in the inactive state.
Figure 19:
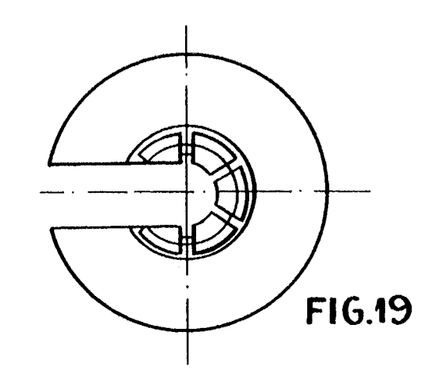
FIG. 19 is a radial cross-section of the anchor of FIG. 18.
Figure 20:
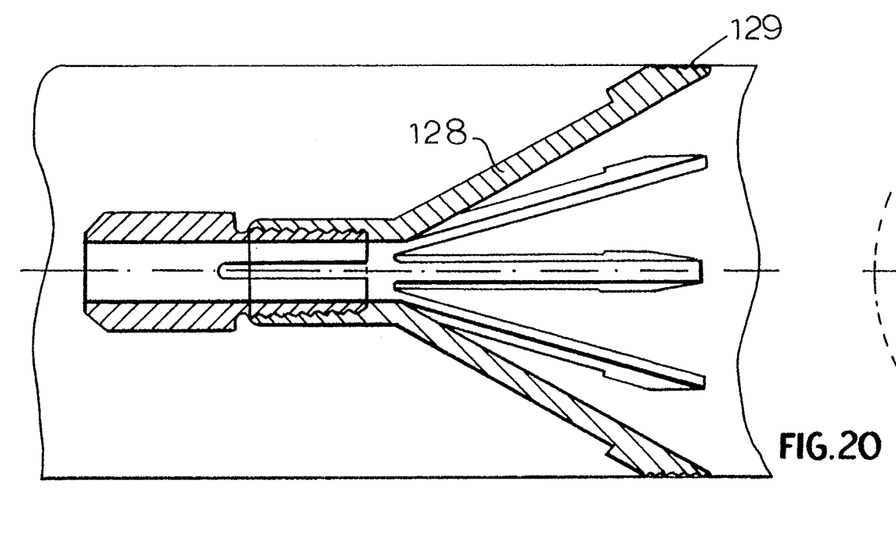
FIG. 20 is a longitudinal cross-section of the anchor of FIG. 18, in the active state.
Figure 21:
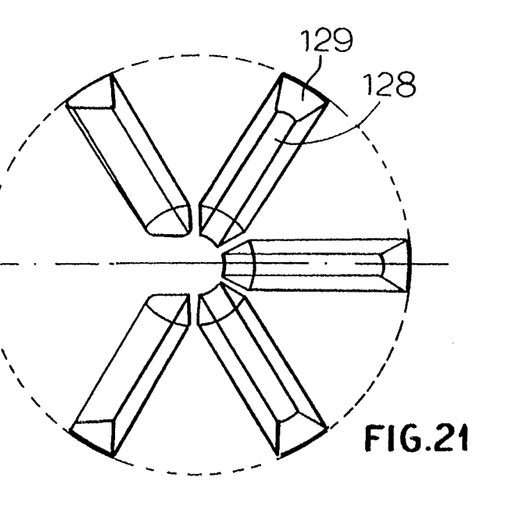
FIG. 21 is a radial cross-section of the anchor of FIG. 20.

FIGS. 18 to 20 show a further embodiment of an anchor 124 according to the invention. The anchor 124 comprises a conical sheaf support 125 which is attached to and surrounds the perimeter of the conduit 121. The anchor 124 also includes a gripping part 127, which comprises circumferentially orientated arms 128 at the end of which are located grips 129 which grip the internal bore of the tube when in the active state as shown in FIG. 20. The anchor 124 can be activated from the inactive state as shown in FIGS. 18 and 19 to the active state as shown in FIGS. 20 and 21 by any of the means already described.

In this embodiment the grips 129 are oriented so that they act to prevent movement of the conduit from left to right relative to the tube. Thus when the anchors 124 are activated it is still possible to move the conduit from right to left but is not possible to move the conduit from left to right. This is useful when installing the conduit.

Figure 22:
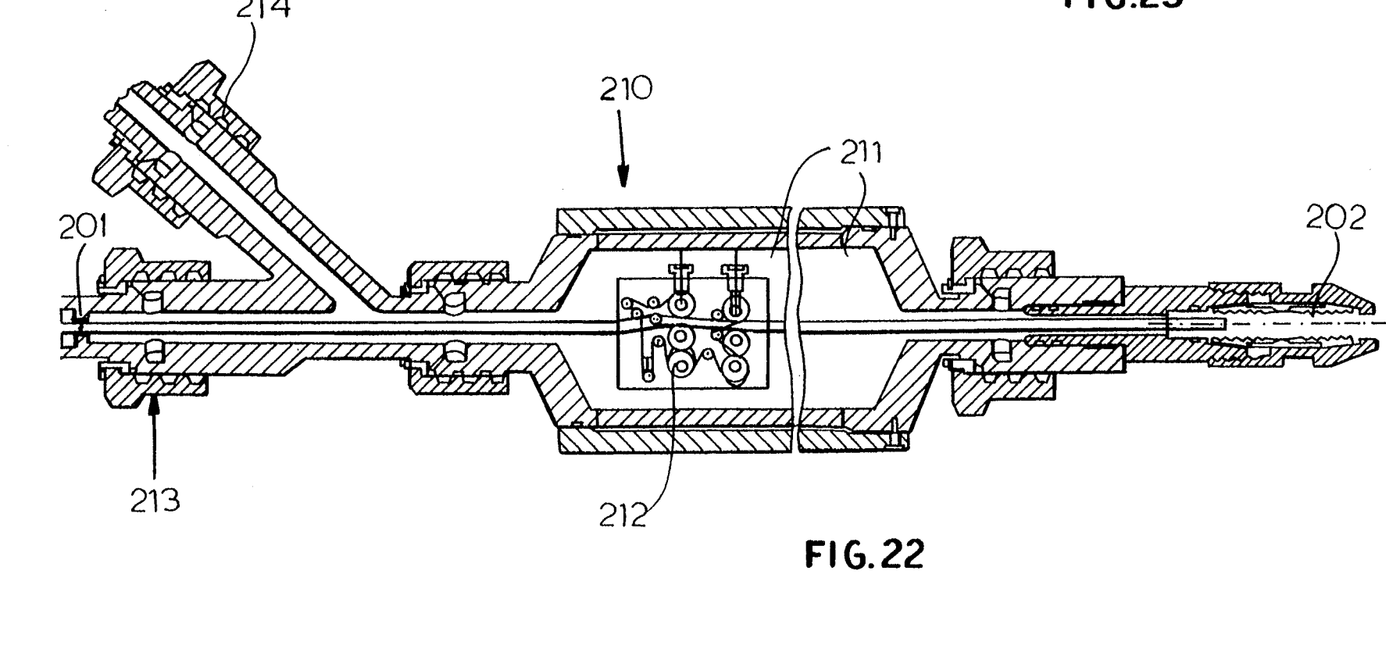
FIG. 22 is a cross-sectional view an apparatus for installing a conduit in a tube.
Figure 23:
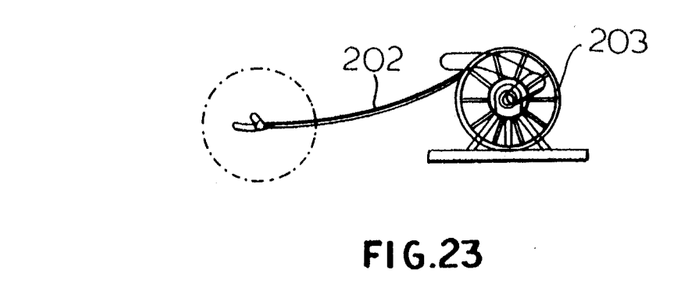
FIG. 23 is a diagrammatic elevation having the conduit being installed in the tube while the tube is coiled on a drum.

Referring now to FIGS. 22 and 23, a novel method is shown for installing a conduit 201 according to the invention in a tube 202. As shown in FIG. 23 the tube 202 is typically a coiled tube which is conveniently coiled on a drum 203 from which the tube 202 can be readily deployed down a well.

The installing apparatus 210 is fitted to the end of the tube 202. The installing apparatus comprises a pressure chamber 211 in which a pulling mechanism 212 is located. The conduit 201 is threaded into the installing apparatus 210 through a seal 213 by the pulling apparatus 212 and finally into the tube 202. Any suitable pulling mechanism can be used comprising conically arranged grippers. Such pulling of the conduit to install it inside the tube 201 is much more effective and less damaging to the conduit than compression of the conduit. The pulling mechanism 212 also preferably comprises cammed pulleys acting on the conduit which serve to induce a wavey profile in the conduit which creates the greater length of the conduit than the tube 202 as discussed previously.

Pressurized fluid is then introduced into the pressure chamber by means of an inlet valve 214. The pressurized fluid is preferably water including a friction reducing agent such as long chain polymers such as polyacrylamides. The pulling mechanism 212 pulls the conduit through the seal 213. A high sealing force is required to achieve the seal 213 and this has to be overcome as more conduit is introduced into the pressure chamber 211. Once the conduit is in the pressure chamber the flow of fluid acts on the conduit dragging it further into the tube 202.

The combination of the pulling tool and the flow rate of the fluid acts to force the conduit 201 down the tube 202. Effective installation is achieved by pulsing the pressure and the pulling on the conduit at the same time. Very short installation times have been achieved with this method.

What is claimed is:

1. A conduit which is to be installed internally of a continuously coiled tube comprising an internal bore capable of use in the oil industry, said tube being installed by lateral movement of the conduit with respect to the coiled tube said conduit comprising a plurality of anchors along its length, said anchors being activatable between an "active" state in which the anchor engages the internal bore of the tube and a "neutral" state in which the anchor is disengaged from the internal bore of the tube such that in the "active" state lateral movement between the conduit and the internal bore of the coiled tube is prevented in least one of the forward and rearward directions.

2. A conduit which is to be installed internally of a tube comprising an internal bore capable of use in the oil industry, said conduit comprising a plurality of anchors along its length, said anchors being activatable between an "active" state in which the anchor engages the internal bore of the tube and a "neutral" state in which the anchor is disengaged from the internal bore of the tube, lateral movement of the conduit relative to the tube in one direction causing the anchor to adopt the "active" state, thus causing the anchor to engage the internal bore of the tube and preventing further lateral movement of the conduit relative to the tube, and lateral movement of the conduit relative to the tube in the opposite direction causing the anchor to adopt the "neutral" state thus disengaging from the internal bore of the tube and permitting further lateral movement in said opposite direction.

3. A conduit according to claim 1, wherein the anchors are activated from the "neutral" state to the "active" state and vise versa by means of gravity.

4. A conduit according to claim 1, wherein the anchors can be activated to a first "active" state in which the conduit is prevented from lateral movement relative to the tube in one direction and a second "active" state in which the conduit is prevented from lateral movement relative to the tube in the opposite direction.

5. A conduit according to claim 1, wherein the anchors when in the "active" state prevent lateral movement of the conduit relative to the tube in both directions.

6. A conduit according to claim 1, wherein the anchors are activated by means of the direction of the flow of a fluid in the tube.

7. A conduit according to claim 1, wherein the anchors are activated by means of a solvent.

8. A conduit which is to be installed internally of a tube comprising an internal bore capable of use in the oil industry, said conduit comprising a plurality of anchors along its length, said anchors being activatable between an "active" state in which the anchor engages the internal bore of the tube and a "neutral" state in which the anchor is disengaged from the internal bore of the tube, such that in the "active" state lateral movement between the conduit and the internal bore of the coiled tube is prevented in at least one of the forward and rearward directions, the length of the conduit exceeding the length of the tube the excess of conduit causing the conduit to form at least one curve or wave within the tube.

9. A conduit according to claim 8, wherein an excess of conduit causes a curve to be formed in the conduit between each anchor.

10. A conduit according to claim 5, wherein the said at least one curve is formed by at least one curved former which is located on the outside of the conduit.

11. The conduit according to claim 1 wherein each anchor comprises a magnesium retaining mechanism which is remotely releasable by using acetic acid or other suitable solvent to activate the anchor between the "active" state and the "neutral" state or visa versa.

12. The conduit according to claim 1 wherein each anchor comprises sprung arms which are adapted to grip against the internal bore of the tube.

13. The conduit according to claim 1 wherein each anchor is constructed so that lateral movement of the conduit relative to the tube in one direction causes the anchor to adopt the "active" state, thus preventing further movement of the conduit relative to the tube, whereas movement of the conduit relative to the tube in the opposite direction causes the anchor to adopt the "neutral" thus permitting further movement in the said opposite direction.

14. The conduit according to claim 1 wherein each anchor has a releasable anchoring mechanism comprising a ratchet mechanism.

15. The conduit according to claim 1 wherein each anchor is made in whole or in part from a material, which would not be dissolved by a solvent which could be used to dissolve magnesium but which could be dissolved by a stronger solvent.

16. The conduit according to claim 15, wherein the stronger solvent is hydrofluoric acid.

* * * * *